April 7, 1953     F. T. KIMBALL     2,634,210

VITAMIN-CONTAINING CHOCOLATE FOOD PRODUCT

Filed Jan. 19, 1951

INVENTOR.
Frank T. Kimball
BY
Robert Calvert
ATTORNEY

Patented Apr. 7, 1953

2,634,210

UNITED STATES PATENT OFFICE 2,634,210

VITAMIN-CONTAINING CHOCOLATE FOOD PRODUCT

Frank T. Kimball, South Norwalk, Conn., assignor to Orizar Products Inc., a corporation of New York Application January 19, 1951, Serial No. 206,751

1 Claim. (Cl. 99—11)

This invention relates to a chocolate food product and particularly to one containing special means for preventing diffusion and mixing of incompatible ingredients. It relates particularly to such product as a two-layer chocolate bar containing in one layer ingredients that are to be kept out of contact with ingredients of the other layer if deterioration is to be avoided. Examples of such ingredients are vitamins and minerals.

It is not new to introduce incompatible components in separate layers of a food product as described in my Patent No. 2,538,202, issued January 16, 1951, for Food Article and Method of Making.

Special problems arise, however, in making a two-layer stable chocolate bar of high biological value, that is, utilized nutritional value in proportion to the weight of the food consumed. In making such a bar, it is desirable to add a large proportion of fat. This fat, being a solvent for various components of the food product, promotes diffusion or even softening, so that ingredients of one layer contact incompatibles of another layer.

My invention provides a means of preventing this diffusion and softening while at the same time increasing the biological value of the food.

Briefly stated, my invention comprises a chocolate food product in two or more layers or zones, an admixed fat, vitamins and minerals dispersed in one or more of the said layers or zones, incompatible ingredients distributed in the other, and a fat retaining and anti-diffusion agent incorporated in one or both of the layers or zones.

The invention will be illustrated by description in connection with the attached drawings.

Figure 1:
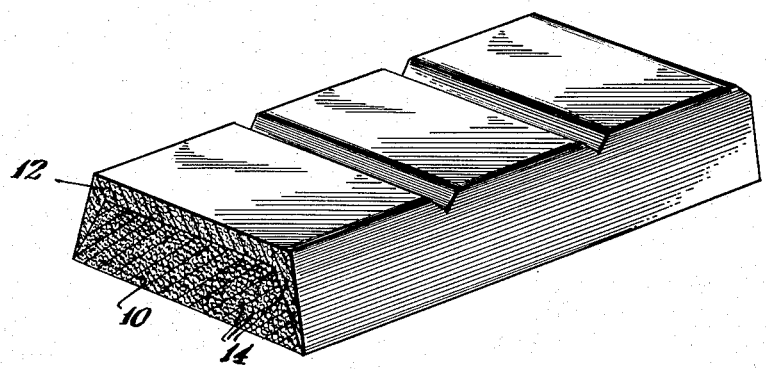
Fig. 1 is a perspective view of my chocolate food product in the form of a bar with an end thereof in section.
Figure 2:
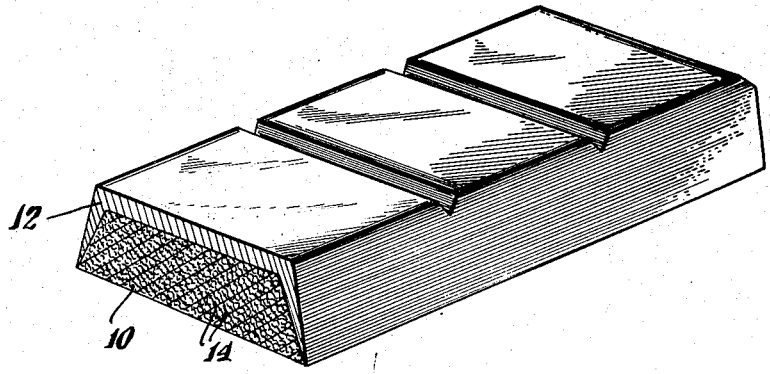
Fig. 2 is a similar view of a modified form of the invention.

There is shown a chocolate bar containing two layers 10 and 12. The anti-diffusion agent 14 is distributed throughout either one or both of the layers as illustrated.

The other ingredients are not separately visible in the composition and therefore are not designated by reference characters. In fact, the anti-diffusion agent 14 is barely visible even with low power magnification. It is somewhat enlarged in scale in the drawings for the purpose of clarity of description of the invention.

As to materials used, the chocolate is any one of the chocolate mixes in commercial chocolate bars. It contains not only chocolate itself but also sugar or other sweetening agent.

The fat that is added is suitably cocoa fat. Other fats that may be used are the common edible fats, as, for example, butter and hydrogenated oils such as hydrogenated soy, cottonseed, or corn oil. The fats may be used alone or in mixture with one or more of the other fats.

The additives are ordinarily vitamin and mineral supplements. A number of these are listed in the examples given later. Those that are compatible with each other are included in one layer and those that are incompatible with this first group are contained in the other layer of the chocolate bar.

The fat retaining and anti-diffusion agent used must be one that is non-toxic and strongly absorbent or adsorbent of fats. The proteins of milk (chiefly casein and lactalbumin) meet these requirements. I have used to advantage a mixture of casein and the solids of low-lactose whey.

To retain the fat and produce the anti-diffusion effect in the presence of the added fat, it is necessary that the proportion of the milk proteins added be large, about 10% to 25% of the weight of the chocolate in the layer or layers in which the milk proteins are incorporated. Ordinarily I use the added proteins in the proportion of 12% to 15%. If milk protein in proportion less than that given is used there is not the desired barrier to diffusion and softening of the product. If the proportion of the milk proteins is above 25% of the weight of the chocolate then there is produced an undesirable flavor and consistency of the chocolate food product.

The protein when of kind described and when used in these large proportions, alters the mass from one in which diffusion or other mixing occurs in warm weather or even up to 50° C. or so to a product in which fat or other material ordinarily subject to migration contacts particles of the milk protein. This contact causes the protein to absorb or adsorb the fat. As a result, the migration and also the normal extracting effect of it on fat-soluble materials is prevented. There is, therefore, substantially no intermixing across the boundary between the two layers of the chocolate.

The order of mixing of the ingredients may be any one that is usual, provided the milk proteins in dry form are incorporated into at least one layer of the composition before that layer is brought into contact with materials that are to form the other layer in the finished product.

The invention is further illustrated in connection with the following examples of the practise of it.

EXAMPLE 1

A chocolate bar composed of two layers is made by blending in separate layers the two sets of ingredients described under "Layer A" and "Layer B" below. Either "A" or "B" may be layer 10 or 12 of the figures.

Proportions here and elsewhere herein are expressed as parts by weight except as stated to the contrary.

Layer A

| | Parts |
|---|---|
| Milk proteins [1] | 300 |
| Low lactose whey solids (25% protein) | 250 |
| Calcium hydrogen phosphate | 20 |
| Sodium iron pyrophosphate | 0.4 |
| Riboflavin | 0.02 |
| Thiamin chloride | 0.01 |
| Niacin | 0.12 |
| Sodium chloride | 15 |
| Potassium citrate | 15 |

[1] The milk proteins are suitably mixed lactalbumin and skimmed milk powder. In one embodiment, these proteins contain admixed cystine, cystein, and choline in physiologic proportions.

The ingredients of Layer A are thoroughly mixed and then stirred into a mixture containing 3,000 parts of dark-coating chocolate mix and 300 parts of cocoa butter as added fat at a temperature below 100° C.

Layer B

| | | Parts |
|---|---|---|
| Lecithin | parts | 10 |
| Tocopherol | part | 0.15 |
| Ascorbic acid | do | 0.75 |
| Vitamin A palmitate (for each gram of lecithin) | units | 5,000 |

The above mixture B is stirred into 1000 parts of dark-coating chocolate mix.

Method of compounding

Layer B is blended at 32° C. Then 70 parts by weight of this blend are poured into a small mold and allowed to harden for 15 minutes in the refrigerator.

Layer A is blended at 37° C. and 180 parts of it are poured on Layer B in the mold. The poured layers are allowed to harden for 30 minutes in the cold.

The product so made was of good flavor, of abnormally high biological value, firm even at temperatures corresponding to a hot summer day and up to 50° C., and free from diffusion or mixing across the border of the two layers at such temperature.

EXAMPLE 2

The general procedure of Example 1 is followed, but the compositions of the two layers are varied as shown below:

Layer A

| | Parts |
|---|---|
| Milk proteins as described | 150 |
| Low lactose whey | 130 |
| Calcium hydrogen phosphate ($CaHPO_4$) | 20 |
| Sodium iron pyrophosphate ($NaFeP_2O_7$) | 0.4 |
| Riboflavin | 0.02 |
| Thiamin | 0.01 |
| Niacin | 0.12 |
| Salt | 15 |
| Potassium citrate | 15 |

These ingredients are mixed and stirred with 2,000 parts of dark coating chocolate mix and 150 of cocoa butter.

Layer B

| | |
|---|---|
| Lecithin, tocopherol, ascorbic acid, and vitamin A palmitate. | In amounts shown in Example 1. |
| Vitamin $D_3$ (synthetic) | 200 units for 100 grams of proteins and whey solids below. |
| Milk protein as described. | 150 parts. |
| Low lactose whey solids | 120 parts. |

Stir the above into 2,000 parts of the chocolate mix and 150 of cocoa butter.

Then composite the Layer A and B materials in a mold as in Example 1.

EXAMPLE 3

The general method of Example 1 is followed except that the vitamin and mineral ingredients of the two layers were changed to the following:

Layer A

| | |
|---|---|
| Cystein | 1%–2% of the milk proteins. |
| Cystine | 0.5%–5% of the milk proteins. |
| Thiamin chloride | Physiologic proportion. |
| Riboflavin and metal salts. | Physiologic proportion. |
| Sodium chloride | To suit taste. |

Layer B

Layer B of Example 1 plus a small proportion of admixed wheat germ oil as an anti-oxidant and vitamins A and D in physiologic proportions.

The food product made as described herein and illustrated in the several examples is not only high in calorific and biological value but one that may be made by conventional candy-making machinery and technique. It is resistant to softening under extreme conditions of exposure to summer temperatures. It is substantially free from any harmful effect of the ingredients of one layer upon those of another.

It will be understood that it is intended to cover all changes and modifications of the examples of the invention herein chosen for the purpose of illustration which do not constitute departures from the spirit and scope of the invention.

What I claim is:

A vitamin-containing chocolate food article of high biological value and stability of vitamin content, the article comprising two parts in intimate contact and adhering to each other, mineral food supplements dispersed in one of the said parts, vitamins incompatible with the mineral supplements dispersed in the other of the parts, and powdered milk protein mixed into at least one of the said parts in proportion to make substantially solid the part containing the admixed protein, the admixed protein serving as a retainer of fat in the chocolate and an anti-diffusion agent preventing mixing of the compatible and incompatible ingredients of the two contacting parts.

FRANK T. KIMBALL.

REFERENCES CITED

The following references are of record in the file of this patent:

UNITED STATES PATENTS

| Number | Name | Date |
|---|---|---|
| 983,014 | Achor | Jan. 31, 1911 |
| 2,425,431 | Le Vangie | Aug. 12, 1947 |
| 2,538,202 | Kimball | Jan. 16, 1951 |

FOREIGN PATENTS

| Number | Country | Date |
|---|---|---|
| 4,326 | Great Britain | 1898 |